Jan. 1, 1963 D. E. KOTAS 3,071,759

VARIABLE FREQUENCY TELEMETERING APPARATUS

Filed May 26, 1958 2 Sheets-Sheet 1

INVENTOR.
DONALD E. KOTAS

BY Arthur H. Swanson

ATTORNEY.

Jan. 1, 1963 D. E. KOTAS 3,071,759

VARIABLE FREQUENCY TELEMETERING APPARATUS

Filed May 26, 1958 2 Sheets-Sheet 2

INVENTOR.
DONALD E. KOTAS
BY Arthur H. Seidman
ATTORNEY.

United States Patent Office 3,071,759

Patented Jan. 1, 1963

3,071,759

VARIABLE FREQUENCY TELEMETERING APPARATUS

Donald E. Kotas, Roslyn, Pa., assignor to Minneapolis-Honeywell Regulator Company, Minneapolis, Minn., a corporation of Delaware Filed May 26, 1958, Ser. No. 737,612

1 Claim. (Cl. 340—206)

Figure 1:
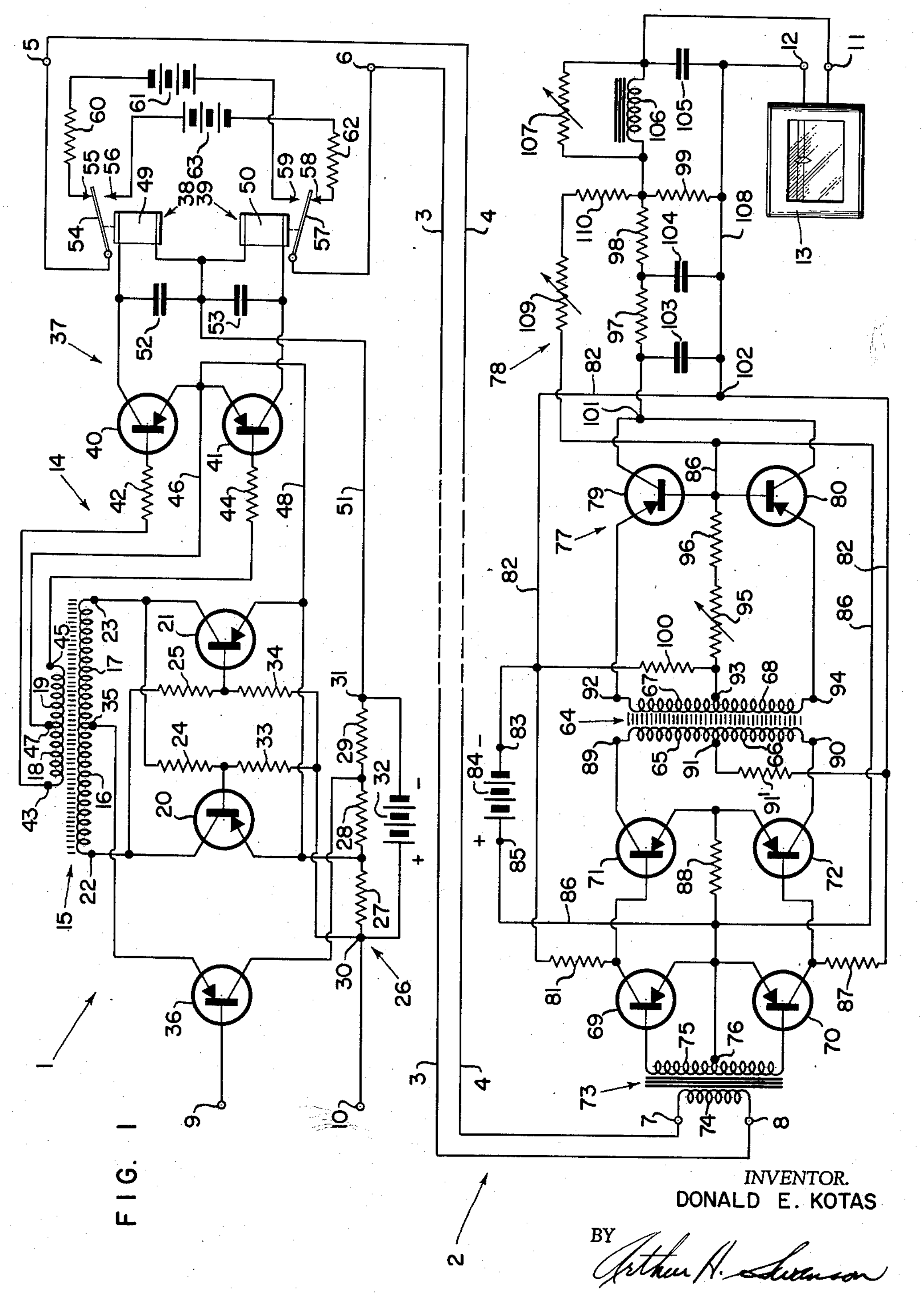

The present invention relates generally to electrical telemetering apparatus, and relates specifically to electrical telemetering apparatus of the variable frequency type. More specifically, the invention relates to frequency-type telemetering apparatus of the kind including a transmitter which produces an output signal of a frequency dependent upon the magnitude of a D.C. input signal, and includes a compatible receiver which produces a D.C. output signal of a magnitude which is dependent upon the frequency of the variable frequency signal received from the transmitter.

A general object of the present invention is to provide improved electrical telemetering apparatus of the variable frequency type. A specific object of the invention is to provide such apparatus including novel and improved transmitting means for converting a D.C. input signal into an A.C. signal to be transmitted having a frequency which is proportional to the magnitude of the D.C. signal, in combination with novel and improved receiving means for converting the received A.C. signal into a D.C. output signal of a magnitude which is proportional to the frequency of the A.C. signal and hence to the magnitude of the original D.C. input signal.

A more specific object of the invention is to provide such improved telemetering apparatus wherein the novel transmitter and the receiver arrangements effect their respective voltage to frequency and frequency to voltage signal conversions by means of the same electrical principle or phenomenon.

A still more specific object of the invention is to provide improved telemetering apparatus as just specified wherein both the transmitter and the receiver employ novel similar circuitry which produces and utilizes constant area electrical pulses in effecting the respective signal conversions.

An even more specific object of the invention is to provide improved telemetering apparatus of the type just described wherein both the transmitter and the receiver circuits employ saturable magnetic means for effecting the respective signal conversions.

Still another specific object of the invention is to provide novel frequency telemetering receiver apparatus and circuitry of the foregoing type which is characterized by its relative simplicity, reliability, and low cost, and by its having particular utility for use in combination with the above mentioned like transmitter circuitry in the foregoing improved telemetering apparatus.

To the end of fulfilling the foregoing and other desirable objects, novel telemetering apparatus embodying the present invention preferably includes a transmitter and a receiver, each of which includes novel, similar circuitry for producing constant area voltage pulses for use in effecting the corresponding signal conversion of voltage to frequency and frequency to voltage, respectively. In the form of apparatus embodying the invention illustrated herein by way of example, each of these circuits for the transmitter and for the receiver includes a saturable core device or saturable transformer which is energized by means of a transistorized synchronous switching arrangement so as to provide the desired constant area pulses.

In the illustrated circuit of the transmitter, the saturable transformer is included in a voltage modulated oscillator circuit which also includes a pair of transistors operated as synchronous switches. These transistors alternately switch a D.C. input voltage across similar windings of the transformer, as a result of which the flux in the saturable core of the transformer is cycled between positive and negative saturation. Feedback signals for these transistors are derived from the transformer windings, whereby the output of the transformer, and of the oscillator, is a square wave, A.C. signal consisting of a series of constant area pulses which occur at a rate or frequency which is proportional to the magnitude of the D.C. input voltage.

Thus, the transmitter circuit produces for transmission to the receiver, an A.C. output signal of a frequency which is proportional to the magnitude of the D.C. input voltage.

In the illustrated circuit of the receiver, the saturable transformer is again included in a circuit which also includes transistors operated as synchronous switches. In this circuit, these transistors alternately switch a constant D.C. voltage across similar windings of the transformer, as a result of which the flux in the saturable core of the transformer is cycled between positive and negative saturation. As for the transmitter circuit, this causes the transformer to produce a square wave. A.C. output voltage consisting of a series of constant area pulses. Since the control signals for the last mentioned transistors are derived from the received A.C. signal, the frequency of occurrence of the pulses is equal to the frequency of the received A.C. signal. Since the applied D.C. voltage is held substantially constant, the heights and widths of the pulses are also substantially constant.

The last mentioned pulse signal is applied to the input of a transistorized current amplifier, and the resulting unidirectional pulse output signal is filtered to produce a D.C. output signal. Since the constant area pulses produced by the transformer are of constant height and width, and occur at a rate which is equal to the frequency of the received signal, the magnitude of said filtered D.C. output signal is proportional to the last mentioned frequency, and hence to the magnitude of the original D.C. input voltage at the transmitter.

Figure 2:
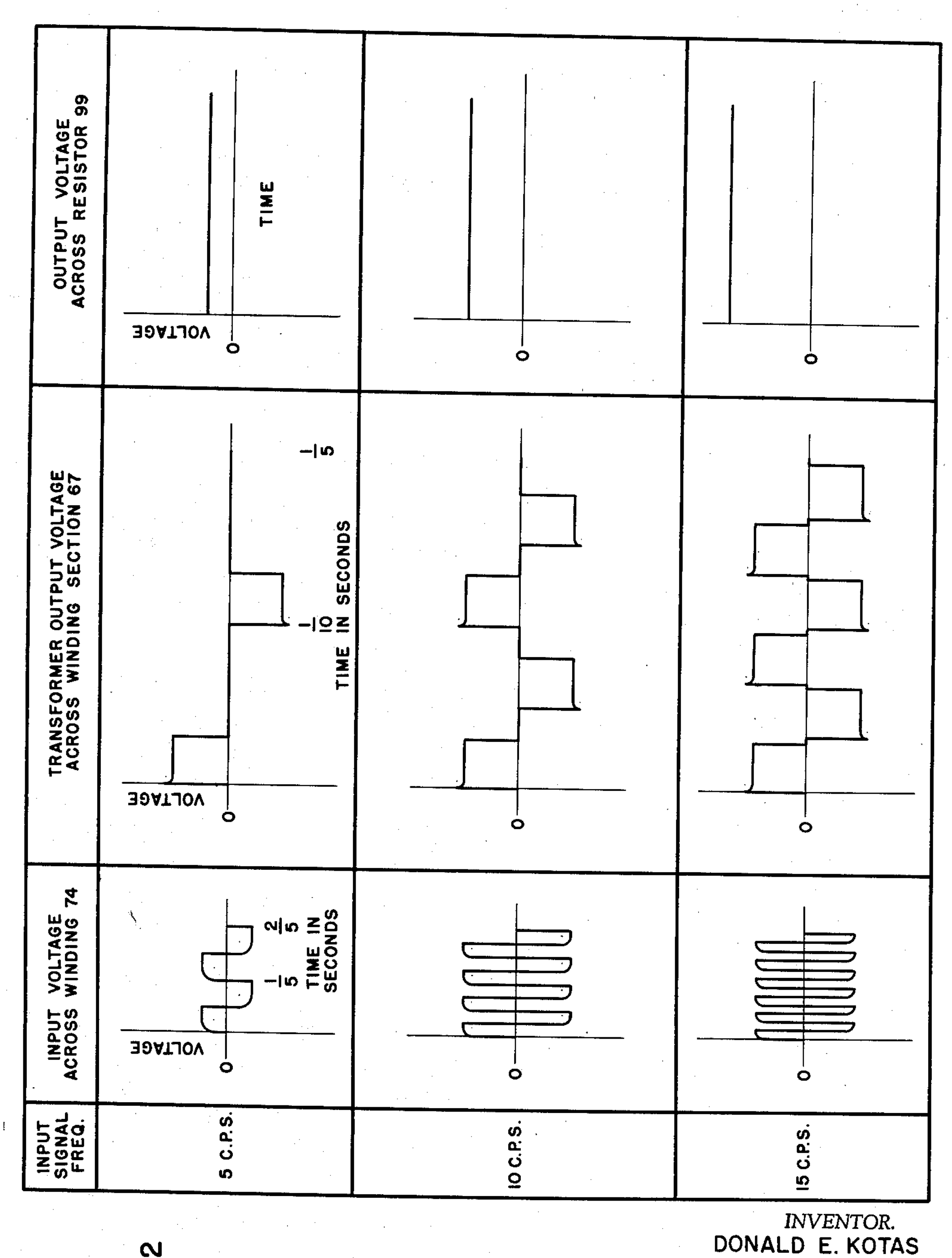

As will be discussed more fully hereinafter, saturable transformer circuitry, as employed in both the transmitter and the receiver of the telemetering apparatus according to the present invention, is particularly well adapted for use in telemetering apparatus, since it readily permits the necessary conversion to and from a variable frequency signal to be made at the low frequencies which are the most practical for transmission over the usual transmission facilities. A better understanding of the present invention may be had from the following detailed description when read in connection with the accompanying drawings, wherein:

FIG. 1 is a schematic circuit diagram of frequency—type telemetering apparatus embodying the present invention; and , FIG. 2 is a series of curves illustrating typical voltages occurring at certain points in the receiver circuit portion of the FIG. 1 apparatus.

Referring now to FIG. 1, there are shown therein the circuits of a transmitter and a receiver forming a frequency-type telemetering arrangement according to the present invention. The transmitter circuit occupies the upper portion of the figure, and is designated by the reference numeral 1. The receiver circuit occupies the lower portion of the figure, and is designated by the reference numeral 2. A transmission path or line, shown by way of example as conductors 3 and 4, connects output terminals 5 and 6 of the transmitter 1 to input terminals 7 and 8 of the receiver 2.

The transmitter 1 also has input terminals 9 and 10 which are adapted to receive a D.C. input voltage or signal whose magnitude is to be telemetered to the location of the receiver 2. The latter, in turn, is provided with output terminals 11 and 12 between which the receiver 2 produces a D.C. output voltage or signal which is proportional in magnitude to that of the original input voltage applied between the transmitter input terminals 9 and 10. The output voltage produced between the terminals 11 and 12 may be utilized in any desired manner, and is shown in FIG. 1, by way of example, as being applied to the input of an indicating recorder 13.

In operation, a D.C. voltage of a magnitude to be telemetered is applied between the transmitter input terminals 9 and 10. The magnitude of this voltage is usually representative of the value of some condition, such as temperature, pressure, flow, etc. The transmitter 1 effectively converts this D.C. input voltage into an A.C. output signal between the terminals 5 and 6, this output signal having a frequency which is proportional to the magnitude of the input voltage, and which is therefore representative of the value of the corresponding condition.

The variable frequency A.C. signal produced by the transmitter 1 is transmitted over the conductors 3 and 4 in the usual manner, and is applied to the receiver input terminals 7 and 8. The receiver 2 effectively converts this received A.C. signal into the aforementioned D.C. output voltage between the output terminals 11 and 12. As previously noted, this magnitude is proportional to the frequency of the transmitted A.C. signal to the magnitude of the original D.C. input voltage applied to the transmitter input terminals 9 and 10, and is representative of the value of the corresponding condition. The recorder 13 to which the receiver output voltage is applied, indicates and records the magnitude or value of this output voltage. If desired, the recorder 13 can be calibrated directly in terms of the value of said corresponding condition.

It is seen from the foregoing that the FIG. 1 apparatus telemeters the value of a variable condition from the location of the transmitter 1 to the location of the receiver 2, and causes this value to be displayed and recorded at the last mentioned location. The specific manner in which this apparatus is constructed, arranged, and operative to effect such telemetering, and the necessary voltage to frequency and frequency to voltage conversions, will now be set forth in detail.

*The Transmitter 1*

The specific transmitter circuit shown in detail in the FIG. 1 example of the present invention is the subject of a copending application of mine which was filed on June 13, 1957, and bears Serial No. 665,421. Said application discloses and claims this transmitter circuit per se as well as the voltage modulated oscillator portion thereof.

As explained in said copending application, the heart of the transmitter 1 is a voltage modulated oscillator circuit which has been designated in FIG. 1 by the reference numeral 14 and which serves to convert a D.C. voltage into an A.C. signal having a frequency which is proportional to the magnitude of the D.C. voltage. To this end, the oscillator circuit 14 includes a saturable core device or transformer 15 having a center-tapped primary winding composed of equal winding sections 16 and 17, and having a center-tapped secondary winding composed of equal winding sections 18 and 19. These windings are wound on a core of square hysteresis loop material.

Included also in the circuit 14 are switching transistors 20 and 21. Each of these transistors has the usual emitter, collector and base electrodes. As shown, the collector of the transistor 20 is connected to an outer end terminal 22 of the primary winding section 16, while the collector of the transistor 21 is connected to an outer end terminal 23 of the primary winding section 17. The base of the transistor 20 is connected through a resistor 24 to the collector of the transistor 21, while the base of the latter is connected through a resistor 25 to the collector of the transistor 20.

The transistors 20 and 21 are also connected to a bias voltage supply 26 which includes resistors 27, 28, and 29 connected in series in the order stated between a positive terminal 30 and a negative terminal 31. The last mentioned terminals are connected across a source of energizing voltage, shown as a battery 32. The bases of the transistors 20 and 21 are connected by respective resistors 33 and 34 to the positive terminal 30 of the supply 26, while the emitters of these two transistors are connected together and to the junction between the resistors 27 and 28. As shown, this junction is negative with respect to the terminal 30, whereby the bases of the transistors 20 and 21 are biased positively with respect to their emitters.

The collectors of the transistors 20 and 21 are also connected to the supply 26 by virtue of a connection to the center tap 35 of the primary winding of the transformer 15. This connection also serves as the input to the oscillator circuit. Specifically, the center tap 35 is connected by way of the emitter-collector circuit of an input transistor 36 to the negative junction between the resistors 28 and 29 of the supply 26. The base of the transistor 36 is connected directly to the input terminal 9, while the other input terminal 10 is connected to the positive terminal 30 of the supply 26. As shown, the input transistor 36 is thus included in a common collector configuration, and effectively applies to the input voltage from between the terminals 9 and 10 to the oscillator circuit 14.

The transistor 36 also serves to isolate the oscillator circuit 14 from the input terminals 9 and 10, and also functions as an impedance changer to prevent the reflection of the variable oscillator load to the transmitter input.

In considering the operation of the oscillator circuit as just described, it should be noted that the transistors 20 and 21 are operated as synchronous switches. When the base of either transistor is positive with respect to its emitter, the transistor will act as an open switch with a very low leakage. When the base of either transistor is negative with respect to its emitter, the transistor will act as a closed switch with very low voltage drop. Thus, in the absence of any control signal on the respective base electrodes of the transistors 20 and 21, the positive bias applied thereto by the resistors 27, 33, and 34 biases these transistors in an open-switch condition. This bias assures good switching operation, but is not essential to the circuit operation.

It should be noted that the input voltage to the circuit 14 of FIG. 1 is applied across the primary winding sections 16 and 17 of the transformer 15 through two separate electrical paths which effect opposing directions of magnetization in the transformer core. The transistor 20 controls the energization of one of these paths, while the transistor 21 controls the energization of the other of these paths.

The transistors 20 and 21 are rendered alternately conductive and non-conductive, as will become apparent during the forthcoming description. As a result, these transistors switch alternately across the winding sections 16 and 17 the output voltage of the transistor 36, which voltage is proportional to the input voltage. This causes the flux in the core of the transformer 15 to be cycled between positive and negative saturation.

The switching action of the transistor 20 is controlled by the potential of the collector of the transistor 21, and similarly, the switching action of the transistor 21 is controlled by the potential of the collector of the transistor 20. Assuming that current is flowing through the primary winding section 16 from the terminal 22 to the center tap 35, the transistor 20 is conducting, and its base is biased for high conduction because of the transformer action of the primary winding of the transformer 15 which makes the end terminal 23 of the primary winding section 17 negative with respect to the end terminals 22. Conversely, the base of the transistor 21 is biased in a non-conductive direction.

The current continues to flow in this manner until the core of the saturable transformer 15 saturates, at which time the voltage across the primary winding drops to zero. This causes the collector voltages of the transistors 20 and 21 to rise to the potential of the center tap 35. Since the end terminals 22 and 23 of the transformer primary winding are now at the same potential, the net current effect is reduced to zero as the transistors 20 and 21 are biased for approximately equal conduction. The flux in the core of the transformer 15, however, follows the path of its square hysteresis loop, whereby this flux decreases slightly as the net current effect is reduced to zero. This decrease in flux creates enough of a voltage reversal to cause the transistor 20 to be cut off and the transistor 21 to conduct. Actually, although the flux decrease is small, the rapidity with which the current effect is reduced to zero causes the voltage reversal to be about thirty percent of the original voltage.

The output voltage of the circuit 14 appears across the secondary winding sections 18 and 19 of the transformer 15, and consists of a square wave, A.C. signal composed of a series of constant area voltage pulses or half-cycles of alternately opposite polarity whose duration depends upon the time necessary for the flux in the transformer core to change from maximum saturation in one direction to maximum saturation in the other direction. Thus, as explained in detail in said copending application, the half-cycle pulse duration of the oscillator output signal depends upon the parameters of the transformer 15 and the magnitude of the applied input voltage between the terminals 9 and 10. Since the transformer characteristics remain constant, the output pulse duration is inversely proportional to the magnitude of said input voltage.

It is seen from the foregoing that the oscillator output signal actually consists of constant area square wave pulses of alternately opposite polarity which occur at a rate for frequency which is proportional to the magnitude of the D.C. input voltage applied to the transmitter 1. Thus, this output is properly referred to as an A.C. output signal of a frequency which is proportional to the magnitude of the applied D.C. input voltage.

The foregoing output signal of the oscillator circuit 14 is applied for amplification to the input of a push-pull transistor amplifier 37 which is employed to drive a pair of relays 38 and 39 in synchronism with the oscillator output signal. The amplifier 37 employs transistors 40 and 41, each having the usual emitter, collector, and base electrodes. As shown, the base of the transistor 40 is connected by means of a resistor 42 to the outer end terminal 43 of the secondary winding section 18 of the transformer 15. Similarly, the base of the transistor 41 is connected by means of a resistor 44 to the outer end terminal 45 of the secondary winding section 19 of the transformer 15.

The emitter of the transistor 40 and the emitter of the transistor 41 are connected together and by means of a conductor 46 to the center tap 47 on the secondary winding of the transformer 15. These connected emitters are also connected by a conductor 48 to the aforementioned junction between the resistors 27 and 28 of the supply 26.

The collectors of the transistors 40 and 41 are connected through the respective windings 49 and 50 of the respective relays 38 and 39 and a conductor 51 to the negative terminal 31 of the supply 26. Condensers 52 and 53 are connected in parallel with the windings 49 and 50, respectively.

The relay 38 has a movable contact 54 and a pair of stationary contacts 55 and 56. When the relay winding 49 is deenergized, the contact 54 engages the contact 55, and when that winding is energized, the contact 54 engages the contact 56. Similarly, the relay 39 has a movable contact 57 and a pair of stationary contacts 58 and 59. When the relay winding 50 is deenergized, the contact 57 engages the contact 58, and when that winding is energized, the contact 57 engages the contact 59.

As shown, the stationary contact 55 of the relay 38 is connected by means of a resistor 60 and a source of power, shown here as the battery 61, to the stationary contact 59 of the relay 39. The stationary contact 58 of the relay 39 is connected by means of a resistor 62 and a source of power, shown here as the battery 63, to the stationary contact 56 of the relay 38. The movable contact 54 of the relay 38 is connected to the circuit output terminal 5. Similarly, the movable contact 57 of the relay 39 is connected to the circuit output terminal 6.

The amplifier 37 operates in such a manner that the transistors 40 and 41 are alternately driven conductive and non-conductive by the output of the oscillator circuit. Thus, the relays 38 and 39 are alternately energized, placing the voltage of the batteries 61 and 63 alternately across the output terminals 5 and 6. When the relay 38 is energized, the movable contact 54 engages the contact 56, and the output terminal 5 is made positive with respect to the output terminal 6 by the battery 63 through the contacts 57 and 58 of the relay 39, which is deenergized. When the relay 39 is energized, the movable contact 57 engages the contact 59, and the output terminal 6 is made positive with respect to the output terminal 5 by the battery 61 through the contacts 54 and 55 of the relay 38, which is deenergized. Thus, the voltages of the batteries 61 and 63 are alternately applied across the output terminals 5 and 6 which, as noted hereinbefore, are adapted to be connected to a suitable telemetering transmission channel 3—4, such as a telephone line.

The relays 38 and 39 are provided for use with noisy or grounded telephone channels, and are not necessary where quiet transmission means are available. Where quiet transmission means are available, the output of the amplifier 37, or even the output of the circuit 14, can be applied directly to the transmission line.

It should be noted that it is not necessary that the output of the transmitter 1 be adapted for push-pull operation. Push-pull operation, however, gives an added margin of safety, in that, if one of the compounds in either half of the circuit fails, causing that half of the circuit to be inoperative, a usable output can still be obtained from the other half of the circuit, since the frequency of the output signal is its significant characteristic. This is especially important where relays having mercury wetted contacts are employed as the relays 38 and 39. While such relays are adapted to provide long life, there is a tendency for the mercury wetted contacts to bridge. If bridging of one of the relay contacts should occur, the output from the other relay in such a case would be sufficient to maintain circuit operation.

The foregoing description makes it readily apparent that the transmitter 1 is perative to produce between its output terminals 5 and 6, for transmission to the input of the receiver 2, an A.C. output signal of a frequency which is proportional to the magnitude of a D.C. input signal applied between the transmitter input terminals 9 and 10.

*The Receiver 2*

As noted hereinbefore, the receiver 2, like the above described transmitter 1, includes a saturable core device in a circuit including transistors operated as synchronous switches. In the receiver 2, this circuit serves to convert the A.C. signal received from the transmitter 1 into the aforementioned square wave, constant area pulse signal which is then amplifier, rectified, and filtered to produce the receiver D.C. output signal which is proportional in magnitude to the frequency of the received A.C. signal.

The receiver saturable core device for saturable transformer has been designated in FIG. 1 by the reference numeral 64. As shown, the transformer 64 includes a center-tapped primary winding composed of equal winding sections 65 and 66, and also includes a center-tapped secondary winding composed of equal winding sections 67 and 68. As for the transmitter transformer 15, the windings of the transformer 64 are wound on a core of square hysteresis loop material.

The synchronous switching transistors for the receiver 2 have been designated in FIG. 1 by the reference numerals 69 and 70. These transistors are followed by transistors 71 and 72. As shown, each of these transistors includes the usual emitter, collector, and base electrodes. These four transistors are included in a common emitter switching configuration which will be described in more detail hereinafter.

The receiver 2 also includes an input transformer 73 having a primary winding 74 which is connected between the receiver input terminals 7 and 8. The transformer 73 also has a secondary winding 75 provided with a center tap connection 76.

Also included in the receiver 2 are a transistorized current amplifier 77 and a filter circuit 78. The amplifier 77 includes transistors 78 and 80 connected in a common base configuration. Each of the portions 77 and 78 will be described more fully hereinafter.

The base of the switching transistor 69 is connected to the upper end terminal of the input transformer secondary winding 75, while the lower end terminal of the latter is connected to the base of the switching transistor 70. The center tap 76 is directly connected to the connected emitters of the two transistors 69 and 70. Thus, the received A.C. signal applied between the receiver inputs terminals 7 and 8 is effectively applied to the transistors 69 and 70 to control the conductivity and switching operation thereof.

The collector of the transistor 69 is connected through a resistor 81 and a negative supply conductor 82 to a negative voltage supply terminal 83, shown herein as the negative terminal of a battery 84. The positive terminal 85 of the latter is connected to a positive supply conductor 86, which in turn is connected to the connected emitters of the transistors 69 and 70. The collector of the transistor 70 is connected to the negative supply conductor 82 by a resistor 87.

The bases of the transistors 71 and 72 are connected, respectively, to the collectors of the respective transistors 69 and 70. The emitters of the transistors 71 and 72 are connected together and through a resistor 88 to the positive supply conductor 86 and thus to the connected emitters of the transistors 69 and 70. Thus, the outputs of the latter are applied to the inputs of the transistors 71 and 72, respectively.

The collector of the transistor 71 is connected through the primary winding section 65 of the saturable transformer 64 to the negative supply conductor 82, while the collector of the transistor 72 is connected to this conductor through the primary winding section 66. Specifically, the collector of the transistor 71 is connected to the outer end terminal 89 of the winding section 65, while the collector of the transistor 72 is connected to the output end terminal 90 of the winding section 66. The center tap 91 between the winding sections 65 and 66 is connected through a resistor 91' to the negative supply conductor 82.

In considering the operation of the receiver circuit as thus far described, it should be noted that the transistors 69 and 70, followed by the transistors 71 and 72, effectively switch the voltage of the battery 84 across the primary of the transformer 64 alternately in opposite directions in synchronism with the alternations of the received A.C. input signal between the terminals 7 and 8, thereby to cycle the flux in the transformer core between positive and negative saturation. Specifically, the A.C. input signal supplied to the transistors 69 and 70 by the input transformer secondary winding 75 normally causes each of these transistors to be driven between cut-off and saturation, alternately, at the frequency of the A.C. input signal. As one transistor is being driven to cut-off, the other is being driven to saturation, and vice-versa. As a result, the output of each of the transistors 69 and 70 is a limited or square wave signal, which is of the same frequency as the A.C. input signal, and which is 180° out of phase with respect to the output signal of the other of these transistors.

The above square wave output signals of the two transistors 69 and 70 are applied to the inputs of the respective transistors 71 and 72, thereby causing the latter to cycle between cut-off and saturation in synchronism with the A.C. input signal and 180° out of phase with each other. As is clear from the foregoing description, the transistor 71 controls the electrical path through the primary winding section 65, while the transistor 72 controls the electrical path through the winding section 66. Accordingly, the foregoing cycling of the transistors 71 and 72 causes the transistor 71 to switch a D.C. voltage from the battery 84 alternately onto and off of the winding section 65 during successive half-cycles of the A.C. input signal in which the transistor 72 switches this voltage off of and onto the winding section 66.

In other words, the square wave-driven transistors 71 and 72 cause a D.C. voltage, supplied by the battery 84, to be switched or applied alternately to the winding sections 65 and 66 in synchronism with the alternations of the A.C. input signal. As will be discussed further hereinafter, the last mentioned D.C. voltage is desirably maintained substantially constant.

In the foregoing description, it was assumed, as noted, that the magnitude of the A.C. input signal applied to control the transistors 69 and 70 was sufficient to cause them to provide the described limiting or switching operation. In the event that this magnitude is not sufficient to produce such operation, the latter will be desirably effected by the transistors 71 and 72.

The foregoing synchronous alternate energization of the primary winding sections 65 and 66 effects the magnetization of the core of the transformer 64 in alternately opposite directions. Specifically, the transistors 71 and 72 drive the flux in said core to saturation in alternately opposite directions in synchronism with the A.C. input signal. Thus, this influx is caused to cycle between positive and negative saturation in synchronism with the last mentioned signal.

The output voltage of the transformer 64 appears across its secondary winding sections 67 and 68. Specifically, a first output voltage is produced across the winding section 67, between an outer end terminal 92 and the winding center tap 93, while a second identical output voltage, 180° out of phase with respect to said first output voltage, is produced across the winding section 68 between its outer end terminal 94 and the center tap 93. For convenience of description, reference to the output voltage of the transformer 64 in the following description will refer to the voltage produced across one of the winding sections 67 and 68, preferably the section 67.

Due to the characteristics of the core of the transformer 64, the latter will support a given, constant volt-second area before it saturates. The magnitude of this constant area is dependent solely on the parameters of the transformer which are, of course, constant for any given transformer. Therefore, the foregoing cycling of the transformer core flux between positive and negative saturation causes the transformer output voltage to be composed of a series of rectangular constant area pulses of alternately opposite polarity which occur at a rate equal to the frequency of the A.C. input signal. In other words, the transformer output voltage is an A.C., square wave, constant area pulse signal of the frequency of the A.C. input signal.

As will be apparent from the foregoing, the area in volt-seconds of each of the output pulses produced by the transformer 64 is constant, and is independent of the A.C. input signal frequency, because this area is dependent solely upon the parameters of the transformer, which, as noted above, remain constant. Moreover, since the D.C. voltage which the transistors switch onto the primary winding sections of the transformer is maintained substantially constant, as noted above, the heights, and hence the widths, of the output pulses remain substantially constant. Therefore, since the frequency of occurrence or repetition rate of these pulses is equal to the frequency of the A.C. input signal, the constant area, height, and width pulses will be spaced apart in the output voltage wave by an amount which increases as the frequency decreases. FIG. 2 shows typical examples of the wave form of the transformer output voltage across the winding section 67 for three different, typical values of input signal frequency.

As will be apparent from a consideration of the transformer output voltage curves of FIG. 2, the length of the half-cycle of the highest input signal frequency to be handled dictates the maximum width or duration which the constant area output pulses produced by the transformer 64 can have. Desirably, the parameters of the transformer 64 and the magnitude of the D.C. voltage applied to the primary winding sections thereof are so chosen as to cause each of the constant area output pulses to have a width or duration which is slightly less than the length of a half-cycle of the highest input signal frequency to be handled. Such a desirable relationship is illustrated by the exemplary transformer output voltage curves of FIG. 2, wherein it is seen that the duration of the constant area output pulses has been made slightly less than the one-thirtieth of a second length of a half cycle of the assumed highest frequency (15 c.ps.) A.C. input signal to be handled.

The output of the transformer 64 is applied to the input of the current amplifier 77, which serves as a constant output current rectifier. To this end, the emitters of the transistors 79 and 80 of this amplifier, which transistors are connected in a common base configuration, are connected to the transformer secondary winding section terminals 92 and 94, respectively. Also, the secondary winding center tap 93 is connected through an adjustable span resistor 95 and a resistor 96 to the connected bases of the transistors 79 and 80. The resistors 95 and 96 are current limiting resistors, and serve to convert the constant area output voltage pulses produced by the transformer 64 into constant area current pulses for application to the input or emitter-base circuits of the transistors 79 and 80.

The collectors of the transistors 79 and 80 are connected together and to the negative supply conductor 82 through a series circuit including, in the order stated, a filter resistor 97, a resistor 98, and an output or load resistor 99. Also, the positive supply conductor 86 is directly connected to the connected bases of the transistors 79 and 80. Finally the transformer secondary winding center tap 93 is connected through a resistor 100 to the negative supply conductor 82. Thus, the amplifier 77 is energized from the battery 84.

The output signal of the amplifier 77 consists of a series of unidirectional current pulses, the average current of which is proportional to the frequency of both the A.C. input signal and the saturable transformer output signal, and is constant for any given value of this frequency within the operating range of the apparatus. The pulse repetition rate or frequency of this amplifier output signal is double the input frequency, due to the full wave rectifying action of the transistors 79 and 80.

The amplifier 77 not only serves as a rectifier, but also causes the output current passed through the load resistor 99 to remain constant, for any given input signal frequency, for various values of load resistance in the receiver output. The amplifier 77 also serves to maintain the load on the secondary winding of the transformer 64 substantially constant for various values of said load resistance. It is also noted that the double frequency output signal of the amplifier 77 is more readily filtered than a single frequency output would be.

As was mentioned hereinbefore, it is desirable to provide a constant source of D.C. voltage for application to the primary winding section of the saturable transformer 64 in order to cause the constant area output pulses of the transformer to have constant heights and widths. The reason that this is desirable is that the use of such constant dimension pulses minimizes the relatively small conversion accuracy error which would otherwise occur as a result of the non-linear loading of the output of the transformer 64 effected by the input of the amplifier 77. Such non-linear loading results from the non-linear input impedance presented by the amplifier 77.

The aforementioned resistor 97, through which the output current of the amplifier 77 passes, is a part of the filter circuit 78. The latter also includes input terminals 101 and 102, filter condensers 103, 104, and 105, a choke 106, a dampening-adjusting, variable resistor 107, and output terminals, which are the receiver output terminals 11 and 12. The filter circuit input terminal 101 is the point at which the resistor 97 is connected to the collectors of the transistors 79 and 80, while the filter input terminal 102 is the point at which the load resistor 99 is connected to the negative supply conductor 82. This connection is made by way of a conductor 108.

The filter condenser 103 is connected across the input terminals 101 and 102, while the filter condenser 104 is connected between the conductor 108 and the junction between the resistors 97 and 98. The filter condenser 105 is connected between the output terminals 11 and 12. The terminal 11 is connected through the choke 106 to the junction between the resistor 98 and 99, while the terminal 12 is connected by way of the conductor 108 to the lower end of the load resistor 99. Thus, the output terminals 11 and 12 are connected across the load resistor 99 in series with the coke 106. The adjustable resistor 107 is connected in parallel with the choke 106.

The components 97, 103, and 104 form an R.C. filter section, which is followed by an LC filter section including the components 105, 106, and 107. The R.C. filter section smooths or averages the pulsating output current of the amplifier 77 to produce a steady unidirectional output current through the load resistor 99, the magnitude of which current is proportional to the frequency of the A.C. input signal, and is constant for any given value of this frequency. This current produces across the load resistor 99*a* D.C. output voltage whose magnitude is also proportaional to the A.C. input signal frequency, and hence to the magnitude of the original D.C. input signal at the transmitter 1. Typical curves of this output voltage for the aforementionad three typical valves of A.C. input signal frequency are shown in FIG. 2.

Since the internal impedance of the recorder 13 is high compared to the impedance of the choke 106, the recorder input is effectively connected across the load resistor 99. Accordingly, the recorder responds to the magnitude of said output voltage produced across the resistor 99.

The aforementioned LC filter ciruit further filters and smooths the output voltage across the resistor 99 before this voltage is applied to the input of the recorder 13. The illustrated design of the entire filter circuit has been found to be such as to make the transient response critically damped and fast enough so that the output voltage can go from its minimum value, corresponding to the minimum value of the frequency of the A.C. input signal, to its maximum value, coresponding to the maximum value of the last mentioned frequency, in a desirably short time, such as one second. The type of filter circuit illustrated has also been found to give practically complete suppression of the ripple in the amplifier 77 output, even at the low end of the frequency range of the A.C. input signal. It has also been found that the transient response can be trimmed to optimum, corresponding to critical damping, by the proper adjustment of the value of the resistor 107 connected across the choke 106.

It has been found further that the small, inherent leakage associated with the transistors 79 and 80 in the amplifier 77 tends to introduce a slight non-linearity into the relationship between input signal frequency and output voltage magnitude. The effect of this is minimized by means of an adjustable suppression resistor 109 and a resistor 110 which are connected in series between the positive supply conductor 86 and the junction between the resistors 98 and 99. The value of the resistor 109 is adjusted to give a desired output voltage value for the low end of the frequency range once the span resistor 95 has been adjusted to give a desired output voltage value for the high end of this range.

Since the saturable transformers in both the transmitter and the receiver, as well as the transistors 20, 21 and 36 in the transmitter and the transistors 79 and 80 in the receiver, tend to exhibit changes in their characteristics and operation for changes in the ambient temperature, it may be desirable to place those components in constant temperature enclosures or to otherwise prevent ambient temperature changes from undesirably affecting the accuracy and stability of the operation of the apparatus. Such procedures are necessary only, of course, in those instances where ambient temperature changes produce undesirable or intollerable operation errors.

As was noted hereinbefore, the use of the foregoing saturable transformers and their associated circuitry in both the telemetering transmitter 1 and receiver 2 is particularly and significantly desirable and of practical importance, since such transformers and circuitry are particularly well adapted for effecting the needed signal conversion to and from a variable frequency signal at the very low frequencies which are the most practical from the telemetering transmission standpoint. The basis for this lies in the fact that telephone channels are the most frequently used means of transmission for telemetered signals. Due to the parameters of telephone channels, it is desirable that the frequency of the telemetered signal be kept low. In addition, the rate charged by telephone companies for these facilities is generally predicated in part on the transmission frequency employed, with the lowest rate being charged where the transmission frequency is below 15 cycles per second. Since the transmitter 1 and the receiver 2 can be readily made to operate at such low frequencies by the proper selections of the characteristics and parameters of the saturable transformers, which selection is readily made, it is seen that the circuits described herein are particularly well adapted for telemetering purposes in the telemetering apparatus combination of the present invention.

It should be readily apparent from the foregoing that there has been provided novel frequency telemetering apparatus wherein both the transmitter and the receiver desirably include saturable transformer circuitry for readily effecting the required signal conversions at frequencies which are particularly advantageous for telemetering signal transmission purposes.

What is claimed is:

Telemetering apparatus, comprising transmitter means and receiver means, each of said means having an input and an output, said transmitter means including first saturable magnetic core means having a center-tapped primary winding and a secondary winding, first means for energizing said primary winding of said first saturable means in accordance with the magnitude of an input signal applied to said input of said transmitter means and for causing said first saturable means to produce in its secondary winding a pulse signal consisting of pulses of substantially constant area occurring at a frequency which bears a predetermined relation to the magnitude of said input signal, and a second means connected to said secondary winding of said first saturable means and to said output of said transmitter means for producing in the last mentioned output an output signal of said frequency, said receiver means receiving in its said input a signal of said frequency and including second saturable magnetic core means having a center-tapped primary winding and a secondary winding, third means for energizing said primary winding of said second saturable means at said frequency to cause said second saturable means to produce in its secondary winding a pulse signal consisting of pulses of substantially constant area occurring at said frequency, and fourth means connected to said secondary winding of said second saturable means and to said output of said receiver means for converting the last mentioned pulse signal into a receiver output signal in the last mentioned output of a magnitude which bears a predetermined relation to said frequency and hence to the magnitude of said input signal, said first and third means including, respectively, a first pair and a second pair of switching transistors, each of said pairs of transistors being synchronously driven at said frequency and connected to said primary winding of the corresponding one of said saturable means to apply to the last mentioned winding saturating D.C. voltages of alternately opposite effect in synchronism with the first mentioned pulse signal, and hence to drive said corresponding one of said saturable means to saturation in alternately opposite directions at said frequency, each of said transistors having an emitter, a collector, and a base, the circuit for said first pair of transistors including a connection between the collector of one of the last mentioned transistors and one end of said primary winding of said first saturable means, a connection between the collector of the other of said last mentioned transistors and the other end of the last menioned winding, a direct connection between the base of each of said last mentioned transistors and the collector of the other of said last mentioned transistors, a connection between the emitters of said last mentioned transistors and one side of said input of said transmitter means, and a connection including a transistor between the other side of the last mentioned input and the center-tap of said last mentioned winding, the circuit for said second pair of transistors including an input transformer having a primary winding connected to said input of said receiver means and having a center-tapped secondary winding connected between the bases of the last mentioned transistors, a connection between the center-tap of the last mentioned winding and the emitters of said last mentioned transistors, a connection between the collector of each of said last mentioned transistors and a corresponding end of said primary winding of said second saturable means, and a connection including a source of unidirectional voltage connected between the center-tap of the last mentioned primary winding and the center-tap of said secondary winding of said input transformer.

References Cited in the file of this patent

UNITED STATES PATENTS

| | | |
|---|---|---|
| 1,929,259 | Rich | Oct. 3, 1933 |
| 2,555,865 | Warren | June 5, 1951 |
| 2,704,842 | Goodell | Mar. 22, 1955 |
| 2,785,236 | Bright | Mar. 12, 1957 |
| 2,908,864 | Shepard | Oct. 13, 1959 |
| 2,947,863 | Buie | Aug. 2, 1960 |
| 2,970,301 | Rochelle | Jan. 31, 1961 |